(12) United States Patent
Sugiura et al.

(10) Patent No.: US 6,763,849 B2
(45) Date of Patent: Jul. 20, 2004

(54) GAS VALVE

(75) Inventors: Tatsuyuki Sugiura, Obu (JP); Kiyoshi Yoshizumi, Toyota (JP); Takeshi Yamamoto, Toyota (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 116 days.

(21) Appl. No.: 10/166,039

(22) Filed: Jun. 11, 2002

(65) Prior Publication Data

US 2002/0189677 A1 Dec. 19, 2002

(30) Foreign Application Priority Data

Jun. 15, 2001 (JP) ........................................ 2001-182107

(51) Int. Cl.⁷ ................................................ F16L 7/00
(52) U.S. Cl. ........................ 137/375; 251/356; 251/368
(58) Field of Search .......................... 137/375; 251/368, 251/356

(56) References Cited

U.S. PATENT DOCUMENTS

| | | | |
|---|---|---|---|
| 3,796,228 A | * | 3/1974 | Bedo et al. .................. 137/536 |
| 4,089,882 A | * | 5/1978 | Takamizawa et al. ....... 556/479 |
| 4,098,295 A | * | 7/1978 | Haytayan ................ 137/625.27 |
| 5,381,819 A | | 1/1995 | Gotthelf |
| 5,746,198 A | | 5/1998 | Taba et al. |
| 5,762,102 A | | 6/1998 | Rimboym |
| 5,957,119 A | | 9/1999 | Perry et al. |
| 6,176,256 B1 | | 1/2001 | Nakajima et al. |
| 6,273,130 B1 | | 8/2001 | Cossins |
| 6,328,054 B1 | | 12/2001 | Martin et al. |

FOREIGN PATENT DOCUMENTS

| | | |
|---|---|---|
| JP | 6449603 | 3/1989 |
| JP | 6449604 | 3/1989 |
| JP | 03249314 | 11/1991 |
| JP | 2000 249000 | 9/2000 |

* cited by examiner

*Primary Examiner*—A. Michael Chambers
(74) *Attorney, Agent, or Firm*—Stevens, Davis, Miller & Mosher, LLP

(57) ABSTRACT

In a gas valve including a valve body having an annular seal surface, of which an axis is disposed to extend in a vertical direction, and of which seal surface a diameter becomes larger toward a lower end of the seal surface, to prevent water drops on the seal surface made by condensation from freezing and to prevent the seal surface from being fixed to a seat because of the freezing, a liquid repellent film is provided on the seal surface of the valve body.

6 Claims, 4 Drawing Sheets

GAS VALVE

FIELD OF THE INVENTION

The present invention relates to a gas valve, and more particularly to a gas valve having an annular seal surface for opening and closing a flow passage of gas.

DESCRIPTION OF THE RELATED ART

Conventionally, to use compressed natural gas (hereafter referred to as CNG) as fuel for an automobile engine, there is a CNG regulator having a constitution as shown in FIG. 4 that decompresses the CNG in a gas cylinder loaded on the automobile into a predetermined pressure, as disclosed in JP-A-2000-249000.

A summary of the CNG regulator shown in FIG. 4 will be described.

There is an intake 2 formed on a body 1. The CNG flows into a chamber 8 through a filter 3, a passage 4, a valve portion 6 of a cut-off valve 5, and a flow-in passage 7. A housing 9 is contained in the chamber 8, and a valve body 10 of a gas valve for pressure control is contained in the housing 9 being capable of rising and falling. Further, there is a port 11 formed in the housing 9.

The valve body 10 is opposed to a seat 12 disposed on an upper portion of the chamber 8 being capable of coming in and out of contact with each other. When the valve body 10 moves downward apart from the seat 12, the high-pressure CNG in the chamber 8 is supplied into a decompression chamber 14 through an annular clearance 13. When the valve body 10 moves upward to contact with the seat 12, the CNG in the chamber 8 is not supplied into the decompression chamber 14.

A cover 15 is fixed on an upper portion of the body 1, and a margin portion 16a of a diaphragm 16 lies between the body 1 and the cover 15. The margin portion 16a is held by the body 1 and the cover 15, and the diaphragm 16 serves as a partition between the decompression chamber 14 and an atmosphere chamber 17. A central portion of the diaphragm 16 is held by a diaphragm holder 18 and a shell 19. A lower portion of the diaphragm holder 18 is connected in a fitting state to an upper edge of the valve body 10. The rising of the diaphragm 16 moves the valve body 10 upward to block up the seat portion 12. The falling of the diaphragm 16 moves the valve body 10 downward to open the seat portion 12.

Between the shell 19 and a regulating screw 20 provided in the cover 15, a pressure control spring 21 is provided to force the diaphragm 16 downward. By a balance between the force of the pressure control spring 21 and the gas pressure of the CNG in the decompression chamber 14, the diaphragm 16 is made to rise and fall, i.e., the valve body 10 is made to open and close, thereby keeping the gas pressure of the CNG in the decompression chamber 14 at a predetermined pressure.

The decompressed CNG in the decompression chamber 14 is supplied from an outlet 22 formed in the body 1 to the automobile engine.

In the CNG regulator having such a constitution as mentioned above, a seal surface 10a of the valve body 10 is formed of a metal surface, which is made merely by processing a metal of which the valve body 10 is made.

In the valves that control the passing and cut-off of the gas containing a large amount of water vapor such as the CNG, if an ambient temperature drops below the dew point after a system such as the regulator or the like has stopped, dew condensation causes water drops to deposit on the seal surface 10a of the valve body 10 as well as on every part.

When there are such water drops depositing, if the seal surface 10a of the valve body 10 has the processed metal surface, the water drops depositing on the seal surface 10a remain on it. When the ambient temperature becomes 0° C. or lower later, the depositing water drops freeze on the seal surface 10a, and the seal surface 10a is fixed to the seal 12. In this case, it might not be possible to start operating next time.

SUMMARY OF THE INVENTION

It is therefore an object of the invention to provide a gas valve for controlling the passing and cut-off of the gas that prevents the freezing and fixing on a seal surface and that prevents a system from being unable to operate.

To solve such problems, the present invention provides a gas valve including a valve body having an annular seal surface, of which seal surface an axis is disposed to extend in a vertical direction, and of which seal surface a diameter becomes larger toward a lower end thereof, wherein a liquid repellent film is provided on the seal surface of the valve body.

In the present invention, if there is gas that contains water vapor in a gas flow passage of an apparatus in which the valve is provided, when an ambient temperature drops below the dew point while the apparatus is stopped, the vapor is condensed to water drops on the seal surface of the valve body. However, the diameter of the seal surface of the valve body becomes larger downward and the seal surface has the liquid repellent film formed on it. Thus, the water drops on the seal surface made by the condensation flow downward by their own weight and do not remain on the seal surface. Therefore, even if the ambient temperature becomes 0° C. or lower later, the water drops do not freeze on the seal surface, and the seal surface and the seat will not be firmly fixed to each other because of the freezing. In this way, it is possible to prevent the valve body from being fixed and from not being able to operate at the time when the apparatus starts operating.

Further, according to the present invention, the liquid repellent film may be formed by being coated with a liquid repellent including a fluoroalkylsilane as a main component.

According to the present invention, a fluoroalkylsilane may be used as the liquid repellent. As this has a very high liquid repellent characteristic, it is highly effective in preventing the water drops from remaining on the seal surface.

Still further, according to the present invention, an annular groove portion may be provided lower than the seal surface of said valve body, and be formed annularly around an entire circumference of the valve body.

With this constitution, the water drops that have flown down from the seal surface, as described above, remain and freeze in the groove portion. Therefore, the water drops freeze in a place where they do not cause trouble for the valve operation, thereby preventing the freezing on the seal surface.

Furthermore, according to the present invention, the groove portion may be provided with a water retention member.

With this structure, the water drops that have flown down from the seal surface are retained in the water retention member provided in the groove portion. Therefore, the water is prevented from flowing into a sliding portion of the valve body positioned under the groove portion and from freezing in the sliding portion. It is thereby possible to prevent the valve body from not being able to operate.

BRIEF DESCRIPTION OF THE DRAWINGS

FIG. 3A is a side view of a valve body showing a sectioned water retention member; FIG. 3B is a sectional view taken along a line IIIB—IIIB in FIG. 3A; FIG. 3C is a sectional view taken along a line IIIC—IIIC in FIG. 3A; FIG. 3D is an enlarged sectional side elevation of an essential portion of the valve body; and FIG. 3E is a partial enlarged sectional view of the seal portion in FIG. 3A.

DETAILED DESCRIPTION OF THE PREFERRED EMBODIMENT

An embodiment according to the present invention will be described with reference to FIG. 1 to FIG. 3E in which the present invention is applied to the same CNG regulator as that in the conventional gas valve.

Figure 1:
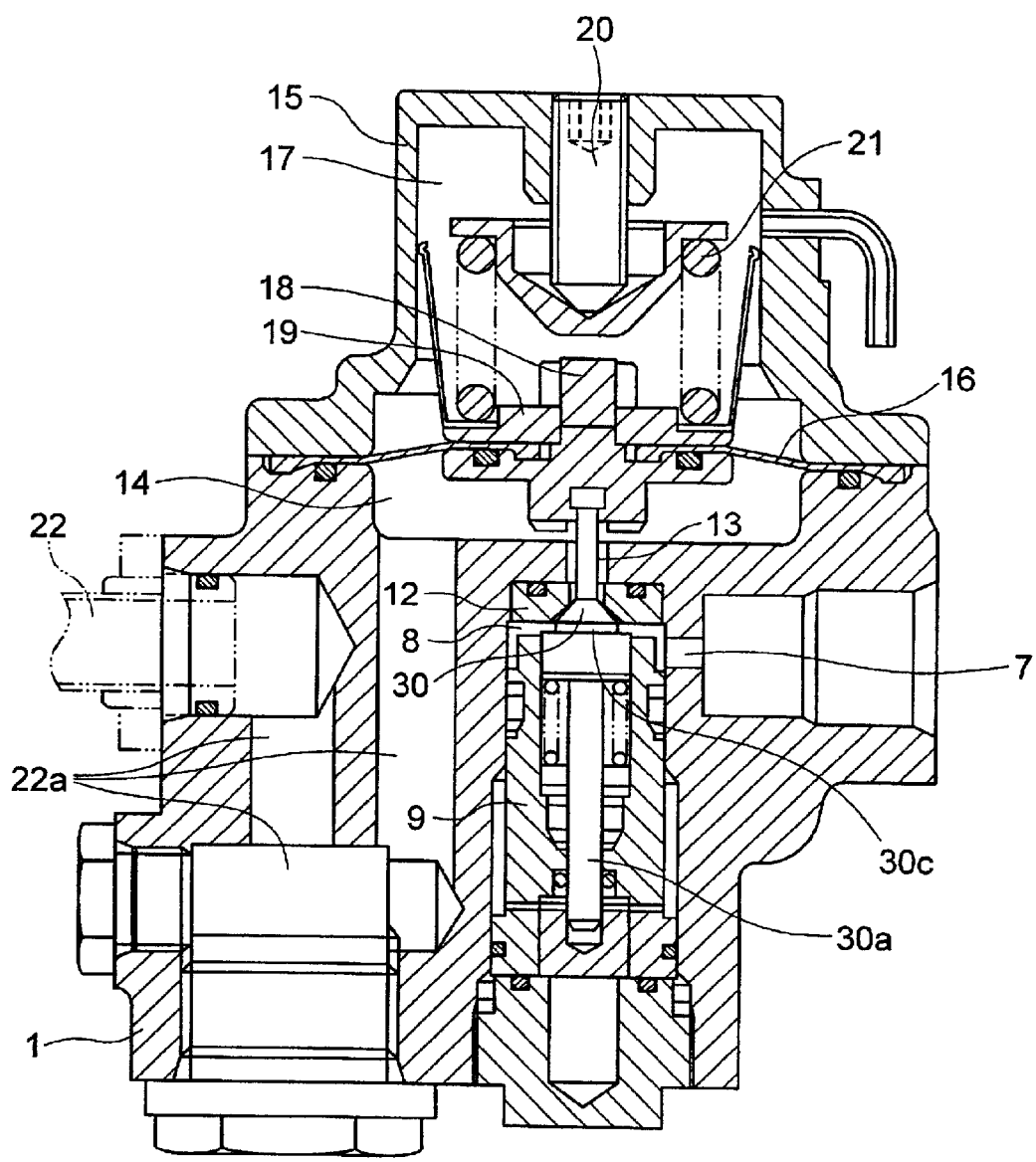
FIG. 1 is a vertical section of a CNG regulator showing a first embodiment of a gas valve according to the present invention used for the CNG regulator.
Figure 2A:
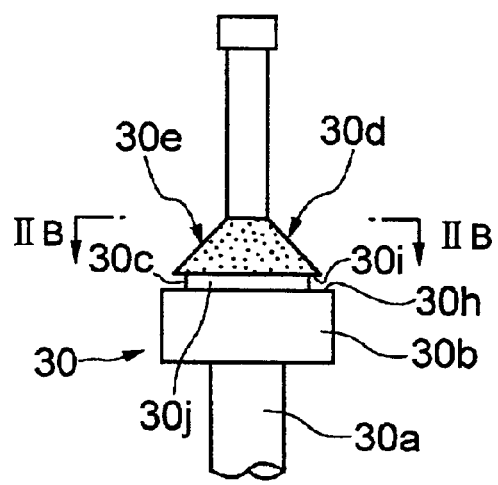
FIG. 2A is an enlarged side view of a valve body of the gas valve shown in FIG. 1.
Figure 2B:
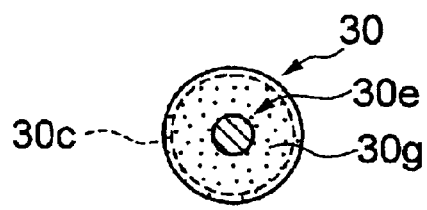
FIG. 2B is a sectional view taken along a line IIB—IIB in FIG. 2A.
Figure 2C:
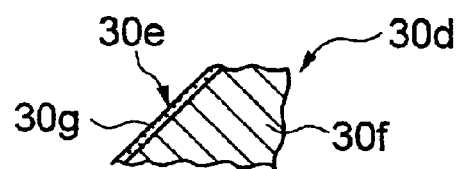
FIG. 2C is a partial enlarged sectional side elevation of a seal portion in FIG. 2A.
Figure 3A:
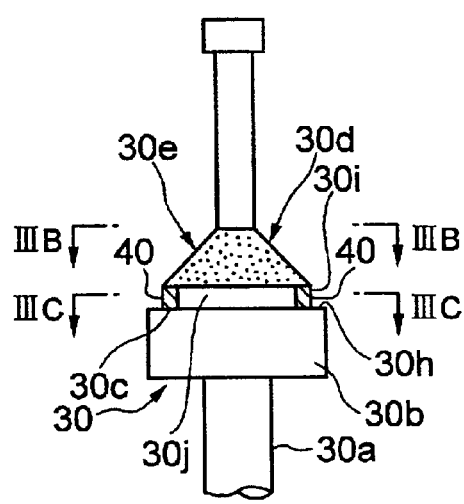
FIGS. 3A to 3E show a second embodiment of a gas valve according to the present invention.
Figure 3C:
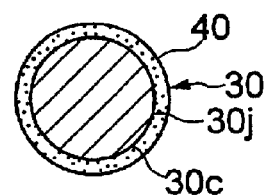
Figure 3B:
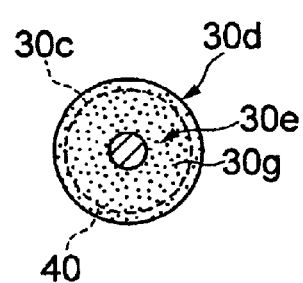
Figure 3D:
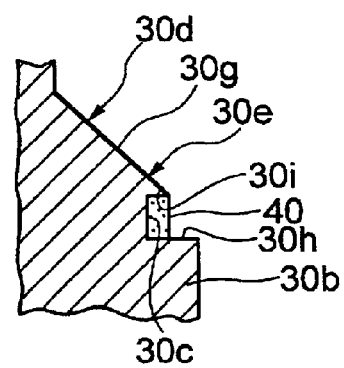
Figure 3E:
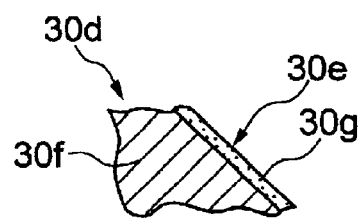

FIG. 1 to FIG. 2C show a first embodiment of a gas valve according to the present invention.

Figure 4:
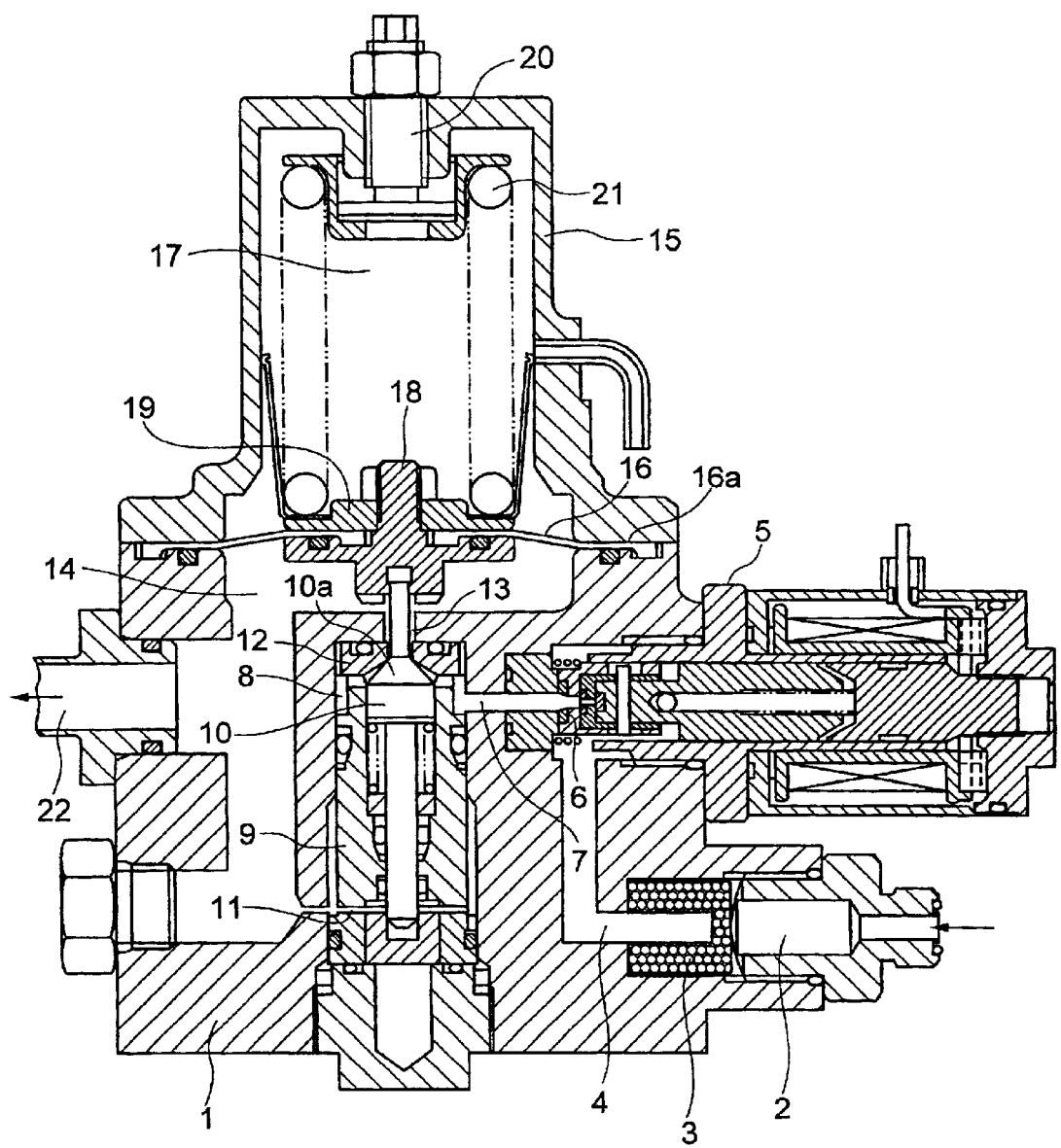
FIG. 4 is a vertical section of the CNG regulator using a conventional gas valve.

A regulator shown in FIG. 1 has the same constitution as the one shown in FIG. 4 except a valve body 30. Therefore, members and portions that are the same as those shown in FIG. 4 are given the same reference numerals and will not be described.

The valve body 30 shown in FIG. 1 to FIG. 2C comprises a large diameter portion 30b formed integrally on an upper portion of a guide rod 30a of which an axis is disposed to extend in a vertical direction, an annular groove portion 30c formed on an upper portion of the large diameter portion 30b, and a seal portion 30d formed on an upper portion of the groove portion 30c.

An outer periphery surface of the seal portion 30d is formed into a seal surface 30e having a conical taper surface of which a diameter enlarges downward. In response to rising and falling of the valve body 30, the seal surface 30e comes in and out of contact with a seat 12 made from a material such as metal or resin to open and close an annular clearance 13 serving as a flow passage. The seal surface 30e is not limited to the conical taper surface and may be any surface that forms an annular seal surface whose diameter becomes larger downward, such as an arc surface whose diameter becomes larger downward in a vertical direction.

Furthermore, as shown in FIG. 2C, the seal surface 30e is formed by providing a liquid repellent film 30g made from a liquid repellent material on a surface of a base member 30f such as metal forming the seal portion 30d. As the liquid repellent material, that is, a liquid repellent, it is preferable, for example, to use coating liquid including FAS (a fluoroalkylsilane) which has high liquid repellency as a main component. As its compositions, those composed of the fluoroalkylsilane, methyltetraethoxysilane, n-butanol, distilled water, phosphoric acid, and ethanol are used. Such FAS is effective since it has very small surface energy and very high liquid repellency.

As the liquid repellent, fluorine-based resin or silicon-based resin that has small surface energy may be used.

As a method of coating (fixing) the base member 30f with the liquid repellent, an evaporation method or an application method can be used, for example. When the evaporation method is used, it is possible to form the liquid repellent film 30g whose film thickness is small (1.5 nm), and thus the evaporation method is desirable.

The groove portion 30c is defined by an upper surface 30h of the large diameter portion 30b, a lower surface 30i of the seal portion 30d, and an outer periphery surface of a middle reduced diameter portion 30j. An outside diameter of the upper surface 30h of the large diameter portion 30b is larger than that of the lower surface 30i of the seal portion 30d. With the structure, liquid that slides down from the seal surface 30e falls on the upper surface 30h and remains in the groove portion 30c.

In such a constitution, high-pressure gas such as the CNG that has flown in from the flow-in passage 7 in FIG. 1 flows into the decompression chamber 14 by the opening and closing operation of the valve body 30 to be decompressed to predetermined pressure, and supplied to an engine from an outlet 22 through a passage 22a, as described earlier.

In a state in which the regulator is stopped after the engine is stopped, when an ambient temperature drops below the dew point, water vapor contained in the gas such as the CNG is condensed to water drops on a surface of the seal surface 30e of the valve body 30. As the diameter of the surface of the seal surface 30e becomes larger downward and the surface is formed of the liquid repellent film 30g, the water drops formed by the condensation slide down by their own weight without remaining on the seal surface 30e, and fall on the upper surface 30h of the large diameter portion 30b. The fallen water drops remain in the groove portion 30c.

Therefore, when the ambient temperature becomes 0° C. or lower, there are not any water drops that are frozen on the seal surface 30e, which prevents the valve body 30 from being fixed to the seat 12 by the freezing. This further prevents the valve body 30 from not being able to operate because of the freezing when the regulator starts operating later. The valve body thereby opens smoothly to allow the gas such as the CNG to be supplied.

The water drops remain in the groove portion 30c and freeze in it, as described. The freezing in the groove portion is not a problem for the opening and closing operation of the valve body 30.

FIGS. 3A to 3E show a second embodiment of a gas valve according to the present invention.

In the second embodiment, into the groove portion 30c of the valve body 30 in the first embodiment shown in FIGS. 2A to 2C, a water retention member 40 is fitted. The water retention member 40 is formed of a material that absorbs and stores water. For example, a non woven fabric made from cellulose as a hydrophilic material, a sponge made from ethylene and propylene, and those made from silica gel as a hydrophilic material, which are formed into an annular shape, are applied. Further, the water retention material 40 is made into an annular shape to fit into the groove portion 30c, and provided around the entire circumference of the groove portion 30c.

Other constitutions are the same as those in the first embodiment, and the same members and portions are given the same reference numerals and will not be described.

In the valve body 30 of the second embodiment, the water drops that slide down from the seal surface 30e are absorbed and retained by the water retention material 40 provided in the groove portion 30c. It is therefore possible to further prevent water that has fallen down on the groove portion 30c from the seal surface 30e from flowing into a sliding portion clearance between the large diameter portion 30b and a housing 9 that are formed under the groove portion 30c, as compared with the valve body 30 of the first embodiment. This prevents the freezing in a clearance between the large diameter portion 30b and the housing 9 and further prevents the valve body 30 from not being able to operate because of the freezing.

In this embodiment, the valve according to the present invention is applied to the CNG regulator as an example. The valve according to the present invention is, however, not limited to this embodiment. The present invention can be applied to a valve controlling the flow of the gas containing water vapor, for example, to a valve controlling the gas flow in a gas flow passage (hydrogen gas flow passage) for a fuel cell.

As described above, according to the present invention, in the valve for controlling the flow of the gas containing water vapor, the liquid repellent film provided on the seal surface of the valve body prevents the valve body from being fixed to the seat because of the freezing and from not being able to start operating.

Further, according to the present invention, it is possible to enhance the effects by using the liquid repellent with particularly high liquid repellency for the liquid repellent film.

Still further, according to the present invention, by forming the annular groove portion around the entire circumference of the valve body in a position lower than the seal surface, the water drops that slide down from the seal surface are remained in the groove portion. The water drops freeze in the groove portion, thereby not causing trouble in the operation of the valve body.

Furthermore, according to the present invention, it is possible to prevent the valve body from not being able to operate by providing the water retention member in the groove portion.

While there has been described in connection with the embodiment, it is obvious to those skilled in the art that various changes and modifications may be aimed within the spirit and scope of appended claims of the invention.

What is claimed is:

1. A gas valve including a valve body having an annular seal surface, of which an axis is disposed to extend in a vertical direction, and of which seal surface a diameter becomes larger toward a lower end thereof, wherein:

a liquid repellent film is provided on said seal surface of the valve body, and an outside diameter of an upper surface in a large diameter portion of said valve body, which large diameter portion is lower than said seal surface, is formed larger than that of a lower surface of a seal portion so as to prevent liquid from flowing downward.

2. The gas valve according to claim 1, wherein said liquid repellent film is formed by being coated with a liquid repellent including a fluoroalkylsilane as a main component.

3. The gas valve according to claim 1, wherein an annular groove portion around an entire circumference of the valve body is formed between the seal surface of said valve body and said large diameter portion.

4. The gas valve according to claim 2, wherein an annular groove portion around a circumference of the valve body is formed between the seal surface of said valve body and said larger diameter portion.

5. The gas valve according to claim 3, wherein said groove portion is provided with a water retention member.

6. The gas valve according to claim 4, wherein said groove portion is provided with a water retention member.

* * * * *